Figure 4:
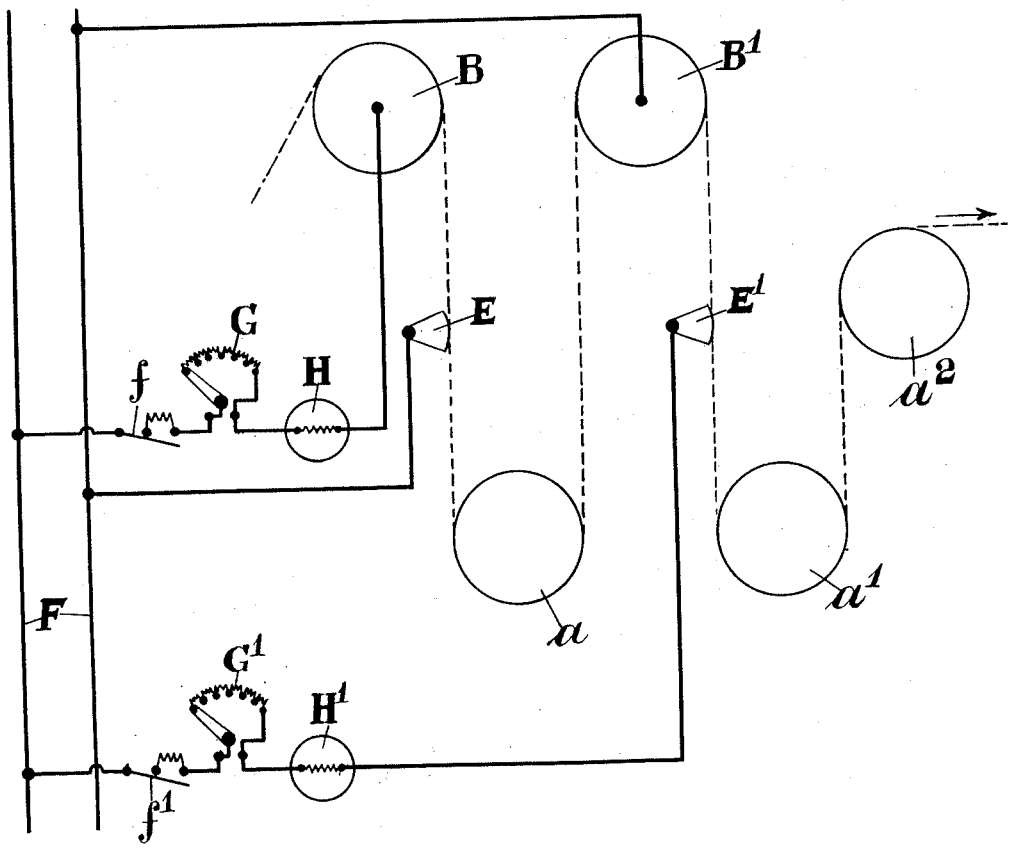

May 3, 1927. 1,626,713
H. ALEXANDER ET AL
APPARATUS FOR THE ELECTRIC HEAT TREATMENT OF WIRE, STRIP, AND THE LIKE
Filed Dec. 29, 1924   3 Sheets-Sheet 1
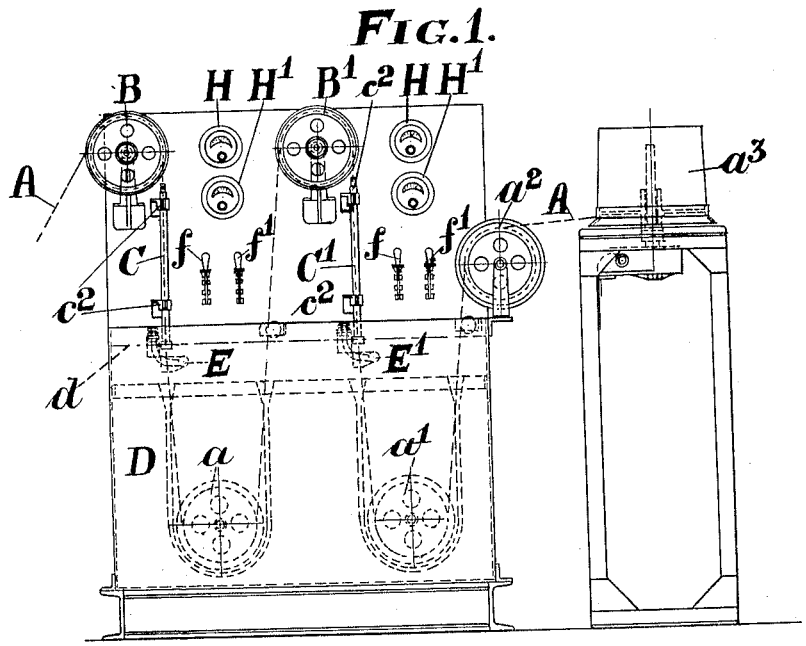
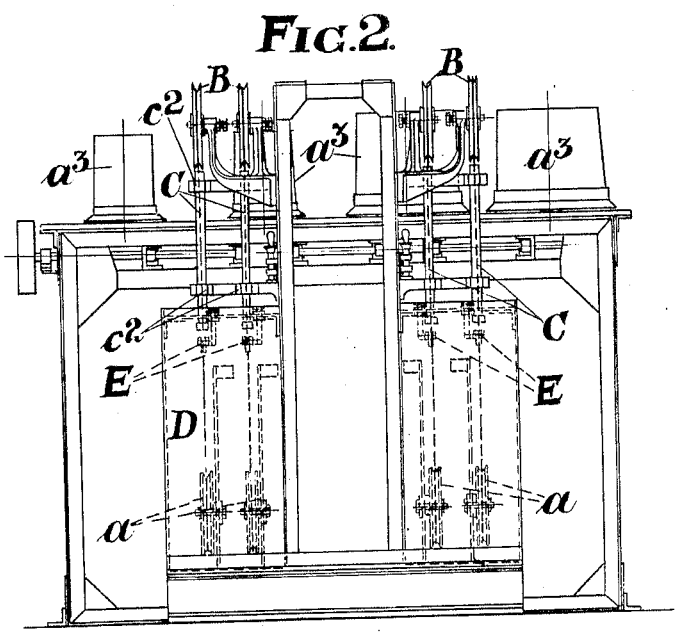
INVENTORS
Herbert Alexander
Arthur Imbury
by O'Neill & Bunn
ATTORNEYS

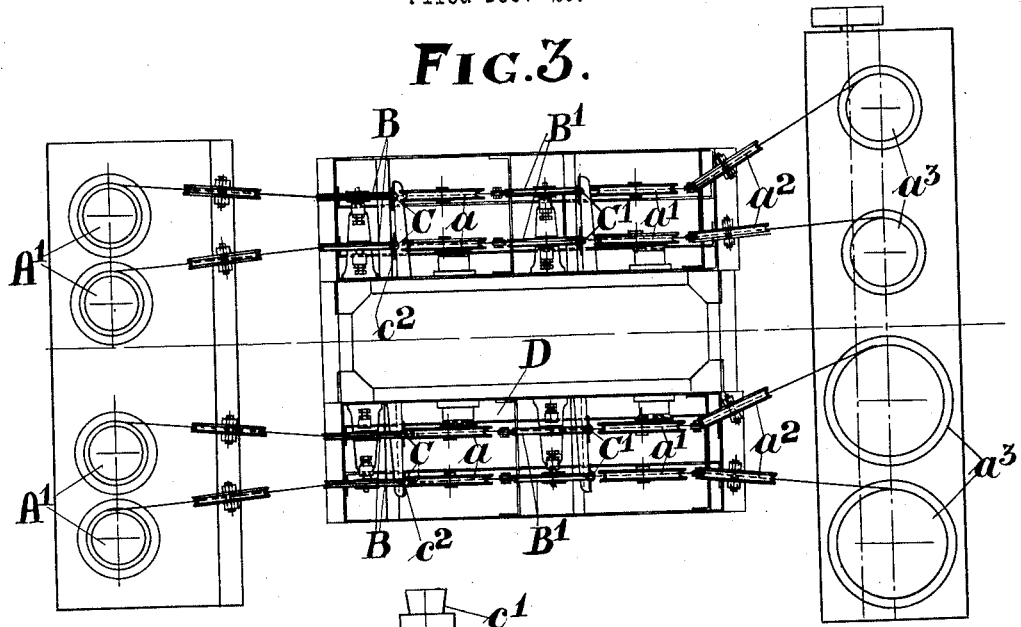

Patented May 3, 1927.

1,626,713

UNITED STATES PATENT OFFICE.

HERBERT ALEXANDER AND ARTHUR IMBERY, OF LEEDS, ENGLAND.

APPARATUS FOR THE ELECTRIC-HEAT TREATMENT OF WIRE, STRIP, AND THE LIKE.

Application filed December 29, 1924, Serial No. 758,618, and in Great Britain October 3, 1924.

This invention relates to a process and apparatus for the electric heat treatment of steel wire, strip and the like, for hardening and tempering purposes wherein the heating process is effected by passing alternating current directly through the travelling wire strip or the like, the ohmic resistance of which and the current flowing through same producing the required temperatures for hardening and tempering respectively.

According to this invention the steel wire, strip or the like hereinafter referred to as wire is caused to travel in contact with an upper electrical contact, through a metal tube which is lined with refractory material and then over and in electrical contact with a lower stationary electrical contact immersed in a quenching bath. Alternating current supplied to the aforesaid contacts passes through the wire and heats it to the temperatures required for hardening and tempering respectively.

In the accompanying drawings:—

Fig. 1 is a front elevation, Fig. 2 an end elevation and,

Fig. 3 a plan of a machine for hardening and tempering metal wire or strip in accordance with this invention, Fig. 4 is a diagram showing the wiring for the electrical connections and Fig. 5 is a detail showing one of the metal tubes drawn to a larger scale and fitted with valves.

The wire A to be hardened and tempered may be placed on a swift or drum $A^1$ Fig. 3. It is then passed over an upper contact B which may comprise a phospher bronze pulley mounted on roller bearings; or a stationary contact may be used. The wire then passes through a tube $c$ Fig. 5 of refractory material which is enclosed within a metal tube or holder C and closed at the top by a packing or other seal $c^1$. The metal tube C is mounted in holders $c^2$ which enable the lower end of the tube $c$ to dip into liquid $d$ in a quenching bath D or to occupy a position slightly above the surface of the liquid $d$. The wire then passes over a lower contact E which is immersed in liquid in the quenching bath and this contact is stationary. After leaving this contact the wire A passes under a guide pulley $a$ situated near the bottom of the bath D and then upwardly to another contact $B^1$ which may be similar to the contact B. The wire then passes through another tube $C^1$ which may be constructed and mounted in a similar manner to the tube C, past another stationary contact $E^1$ in the quenching bath, under another guide pulley $a^1$ near the bottom of the latter, over a tension pulley $a^2$ situated above the bath and from the latter to a winding drum $a^3$. Adverting to the diagram shown in Fig. 4 alternating current passes from the mains F to the contacts B, E, and $B^1$, $E^1$, by way of switches $f$ $f^1$ variable resistances G, $G^1$, which can be regulated to control the current passing through the wire and thus control the extent of heating of the wire, ammeters H, $H^1$ being interposed in the circuits as shown. As the wire passes between the first two contacts B and E it becomes heated to the temperature required for hardening, and as the wire passes over the contact E in the quenching bath it vaporizes to a certain extent the liquid which may be oil or other quenching medium and enables a good electrical contact to be obtained, which is further assisted by friction due to the wire travelling over the stationary contact. This avoids pitting of the wire or creating any intermittent electrical contact or action and enables results to be obtained which are impossible when the lower contact is of the rotating type and not immersed. As the wire travels through the tube C it is heated in practically a neutral atmosphere, obtained by burning out the oxygen content of the air in the tube by the heat of the wire. This enables bright wire to be obtained without the necessity of polishing or pickling provided the wire is bright to commence with. Provision may be made for admitting inert gas such for example as hydrogen into the tube $c$ to cleanse the wire when heated. For this purpose the refractory tube $c$ is formed with an upper branch passage $c^3$ and a lower branch passage $c^4$ which enter similar branch passages $c^5$ $c^6$ in the holder C and are caused to make a tight joint therewith by packing $c^7$. Attached to the branches $c^5$ $c^6$ are two valves $c^8$ $c^9$ provided with branches $c^{10}$ either of which can be connected with the inert gas supply. If it be desired to obtain black or coloured wire this can be effected by admitting air or other oxidizing influence to the travelling wire by means of the valves $c^8$ $c^9$ and adjusting the current input for the temperature required. As the wire enters the bath in a vertical position it becomes quenched at a definite point and definite temperature which is difficult to obtain in the horizontal type of machine owing to the tendency of oil to flow along the wire. After the wire has been hardened it is subjected to a second heating process between the contacts $B^1$ $E^1$ for effecting the tempering operation. Although the machine shown is constructed to harden and temper four wires it may be constructed to harden and temper one, two or more wires. Each wire is under separate electrical control, so that within certain limits wires of different gauge may be hardened and tempered at the same time.

What we claim as our invention and desire to secure by Letters Patent in the United States is:—

1. In apparatus for hardening and tempering travelling steel wire, strip and the like, a vessel for holding a quenching medium for cooling the wire, a pair of electrical contacts situated above the vessel, a pair of stationary electrical contacts submerged in the quenching medium for making frictional contact with the travelling wire, the said contacts being arranged to allow the wire to maintain an approximately vertical position in relation to the quenching medium, means for guiding the wire from one upper and lower contact to the other upper and lower contact, means for conducting an electric current to one upper and lower contact to heat the portion of wire between them to a temperature at which it will harden when quenched, means for conducting an electric current to the other upper and lower contact to heat the portion of wire between them sufficiently to temper the wire, means for controlling the heating of the wire for hardening purposes and means for controlling the heating of the wire for tempering purposes.

2. In apparatus for hardening and tempering travelling steel wire, strip and the like, a vessel for holding a quenching medium for cooling the wire, a pair of electrical contacts situated above the vessel, a pair of stationary electrical contacts submerged in the quenching medium for making frictional contact with the travelling wire, the said contacts being arranged to support the wire in an approximately vertical position in relation to the quenching medium, means for guiding the wire from one upper and lower contact to the other upper and lower contact, a substantially airtight chamber interposed between each upper and lower contact for the wire to pass through, valves mounted on the chamber, means for conducting an electric current to one upper and lower contact to heat the portion of the wire between them to a temperature at which it will harden when quenched, means for conducting an electric current to the other upper and lower contact to heat the portion of the wire between them to a temperature at which it will harden when quenched, means for conducting an electric current to the other upper and lower contact to heat the portion of wire between them sufficiently to temper the wire when quenched, means for controlling the heating of the wire for hardening purposes and means for controlling the heating of the wire for tempering purposes.

3. In apparatus for hardening and tempering travelling steel wire, strip and the like, a vessel for holding a quenching medium for cooling the wire, a pair of electrical contacts situated above the vessel, a pair of stationary electrical contacts submerged in the quenching medium, the said upper and lower contacts being arranged to allow the wire to maintain an approximately vertical position in relation to the quenching medium, means for guiding the wire from one upper and lower contact to the other upper and lower contact, a substantially airtight chamber interposed between each upper and lower contact for the wire to pass through, each of said chambers comprising a refractory tube formed with an upper branch passage and a lower branch passage, a holder for the refractory tube formed with branch passages to engage the branch passages on the tube, means for making a tight joint between the branch passages on the tube and those on the holder, valve casings mounted on the holder branch passages and provided with branch pipes for connection with an inert gas supply, and, when required for admitting air, means for conducting an electric current to one upper and lower contact to heat the portion of wire between them to a temperature at which it will harden when quenched, means for conducting an electric current to the other upper and lower contact to heat the portion of wire between them sufficiently to temper the wire when quenched, means for controlling the heating of the wire for hardening purposes and means for controlling the heating of the wire for tempering purposes.

In testimony whereof we affix our signatures.

HERBERT ALEXANDER.
ARTHUR IMBERY.